(12) United States Patent
Hung

(10) Patent No.: US 9,798,337 B2
(45) Date of Patent: Oct. 24, 2017

(54) CONTROL SYSTEM USING POWER LINE COMMUNICATION

(71) Applicant: DiWIN Technology Co., Ltd., Taoyuan (TW)

(72) Inventor: Yu-Cheng Hung, Taoyuan (TW)

(73) Assignee: DIWIN TECHNOLOGY CO., LTD., Taoyuan (TW)

( * ) Notice: Subject to any disclaimer, the term of this patent is extended or adjusted under 35 U.S.C. 154(b) by 322 days.

(21) Appl. No.: 14/660,409

(22) Filed: Mar. 17, 2015

(65) Prior Publication Data

US 2016/0274605 A1 Sep. 22, 2016

(51) Int. Cl.
| | |
|---|---|
| *H01H 31/10* | (2006.01) |
| *H01H 33/52* | (2006.01) |
| *H01H 33/59* | (2006.01) |
| *H01H 47/00* | (2006.01) |
| *H01H 85/46* | (2006.01) |
| *G05F 1/12* | (2006.01) |
| *H04B 3/56* | (2006.01) |

(52) U.S. Cl.
CPC ............ *G05F 1/12* (2013.01); *H04B 3/56* (2013.01)

(58) Field of Classification Search
CPC .. H04B 3/54–3/58; H04B 2203/54–2203/5495
See application file for complete search history.

(56) References Cited

U.S. PATENT DOCUMENTS

| 4,433,326 A * | 2/1984 | Howell | H04B 3/54 |
| | | | 307/3 |
| 6,163,444 A * | 12/2000 | Lam | H02H 3/334 |
| | | | 361/42 |
| 2006/0227884 A1* | 10/2006 | Koga | H04B 3/54 |
| | | | 375/257 |
| 2006/0244571 A1* | 11/2006 | Yaney | H04B 3/56 |
| | | | 333/24 R |
| 2008/0203820 A1* | 8/2008 | Kramer | H02J 3/38 |
| | | | 307/64 |
| 2013/0100966 A1* | 4/2013 | Huang | H04B 3/54 |
| | | | 370/503 |
| 2013/0241291 A1* | 9/2013 | Wang | H02J 9/06 |
| | | | 307/66 |
| 2013/0264888 A1* | 10/2013 | Sako | H04B 5/0037 |
| | | | 307/104 |
| 2015/0028690 A1* | 1/2015 | Sako | H02J 3/005 |
| | | | 307/104 |

* cited by examiner

*Primary Examiner* — Jared Fureman
*Assistant Examiner* — Esayas Yeshaw
(74) *Attorney, Agent, or Firm* — Hamre, Schumann, Mueller & Larson, P.C.

(57) ABSTRACT

A control system includes a control device adapted to be connected to a live line and a neutral line that transmit a grid power, and to a load via a first power line and a second power line. The control device includes: a first switch adapted to be connected between the live line and the first power line; a second switch adapted to be connected between the neutral line and the second power line; a coupler adapted to be connected to the first power line, receiving a communication signal, and coupling the communication signal to the first power line; and a controller controlling the first and second switches to synchronously alternate between an ON state and an OFF state, and outputting the communication signal to the coupler when the first and second switches operate in the OFF state.

10 Claims, 3 Drawing Sheets

CONTROL SYSTEM USING POWER LINE COMMUNICATION

FIELD

This disclosure relates to a control system, and more particularly to a control system using power line communication.

BACKGROUND

A conventional control system outputs a grid power to a load via two parallel power lines. In addition, the power lines are also used for signal transmission from the conventional control system to the load (i.e., power line communication). The conventional control system has the following drawbacks:

1. Interference in the signal as attributed to the grid power is relatively high.
2. Power consumption of the conventional control system is relatively large.
3. Compatibility of the conventional control system with the load is relatively poor.
4. Distortion of the signal is relatively serious when the power lines are relatively long.

SUMMARY

Therefore, an object of this disclosure is to provide a control system that can overcome at least one of the aforesaid drawbacks associated with the prior art.

According to this disclosure, a control system includes a control device adapted to be connected to a live line and a neutral line that transmit a grid power, and to a load via a first power line and a second power line. The control device includes a first switch, a second switch, a coupler and a controller. The first switch is adapted to be connected between the live line and the first power line. The second switch is adapted to be connected between the neutral line and the second power line. The coupler is adapted to be connected to the first power line, receives a communication signal, and couples the communication signal to the first power line. The controller is connected to the first and second switches and to the coupler, controls the first and second switches to synchronously alternate between an ON state and an OFF state, and outputs the communication signal to the coupler when the first and second switches operate in the OFF state, so as to allow transmission of the grid power to the load when the first and second switches operate in the ON state, and to allow transmission of the communication signal to the load when the first and second switches operate in the OFF state.

BRIEF DESCRIPTION OF THE DRAWINGS

Other features and advantages of this disclosure will become apparent in the following detailed description of the embodiments of this invention with reference to the accompanying drawings, of which.

DETAILED DESCRIPTION

Figure 1:
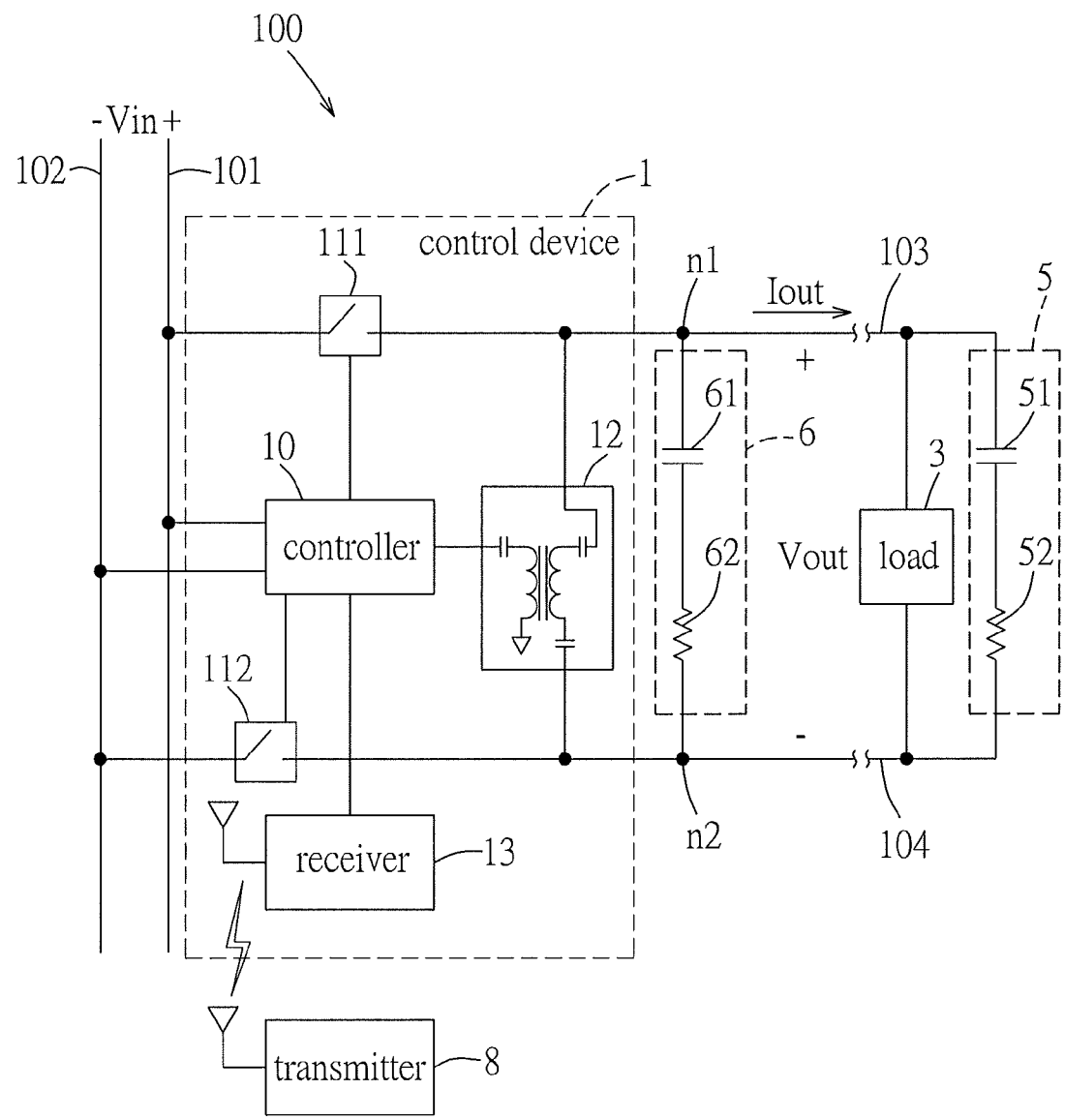
FIG. 1 is a schematic circuit block diagram illustrating an embodiment of a control system according to this disclosure, adapted to be connected to a live line and a neutral line that transmit a grid power and to a load via a first power line and a second power line.
Figure 2:
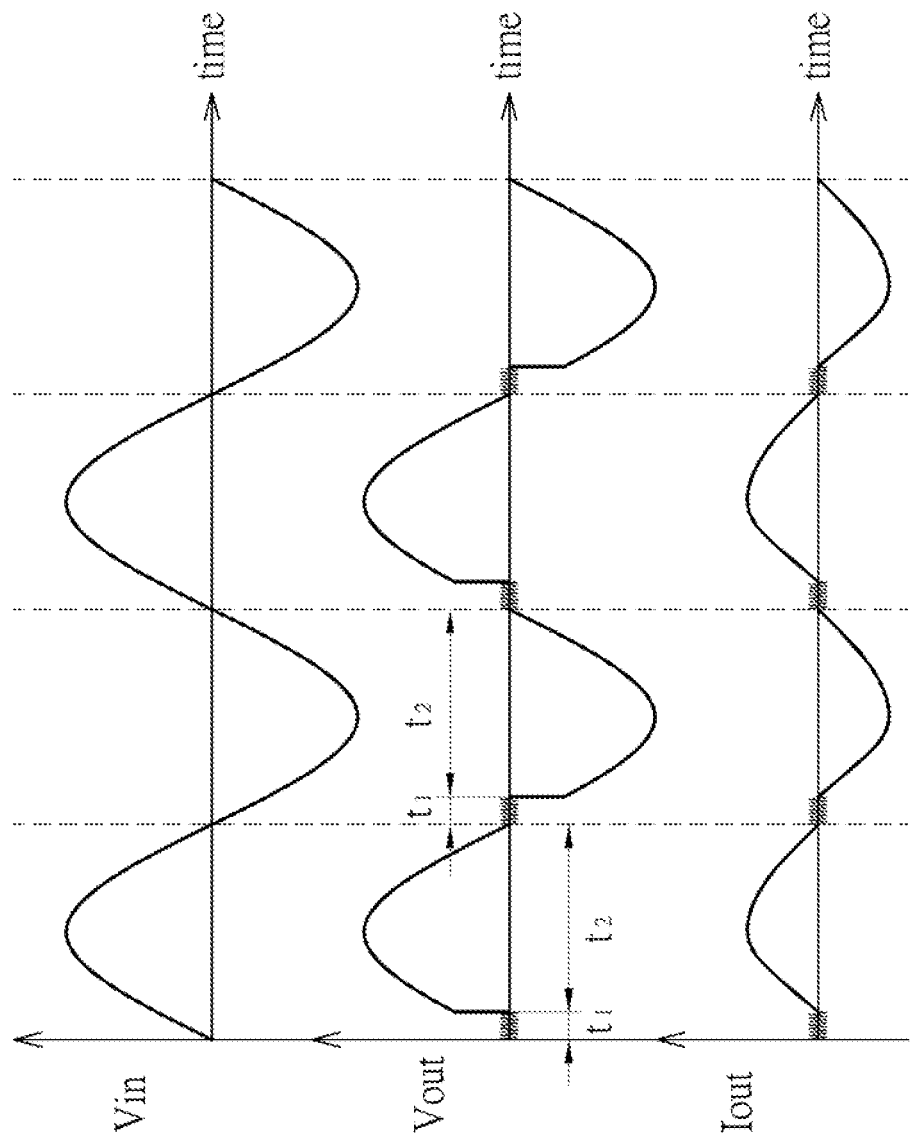
FIG. 2 is an exemplary timing diagram illustrating a voltage of the grid power, and a voltage and a current that are outputted by the embodiment to the load.

Referring to FIGS. 1 and 2, an embodiment of a control system 100 according to this disclosure includes a control device 1, a first matching device 5 and a second matching device 6.

The control device 1 is adapted to be connected to a live line 101 and a neutral line 102 that transmit a grid power, and to a load 3 (e.g., a light emitting device or a motor) via a first power line 103 and a second power line 104. The control device 1 includes a first switch 111, a second switch 112, a coupler 12, a controller 10 and a receiver 13.

The first switch 111 is adapted to be connected between the live line 101 and the first power line 103.

The second switch 112 is adapted to be connected between the neutral line 102 and the second power line 104.

The coupler 12 is adapted to be connected to the first and second power lines 103, 104, receives a communication signal, and couples the communication signal to the first and second power lines 103, 104 via, for example, inductive coupling and in such a manner that signals induced respectively on the first and second power lines 103, 104 by the communication signal are complementary to each other, e.g., have equal and opposite excursions (i.e., constitute a differential signal pair). In other words, the coupler 12 uses differential signaling techniques.

The receiver 13 receives from a transmitter 8 in a wireless manner (e.g., using Wi-Fi, Bluetooth, near field communication (NFC) or Zigbee) an input signal carrying a command.

The controller 10 is adapted to be connected to the live line 101 and the neutral line 102, and is connected to the first and second switches 111, 112, the coupler 12 and the receiver 13. The controller 10 controls the first and second switches 111, 112 to alternate synchronously between an ON state and an OFF state with an adjustable duty ratio, and switches the first and second switches 111, 112 from the ON state to the OFF state when a voltage (Vin) of the grid power is substantially equal to (i.e., approximating or equal to) zero. In addition, the controller 10 receives the input signal from the receiver 13, generates, based on the input signal, the communication signal that carries the command and that has a frequency (e.g., 200 kHz) higher than that of the grid power (e.g., 60 Hz), and outputs the communication signal to the coupler 12 during each time period ($t_1$) where the first and second switches 111, 112 operate in the OFF state.

As a result, during each time period ($t_2$) where the first and second switches 111, 112 operate in the ON state, transmission of the grid power to the load 3 via the first and second switches 111, 112 and the first and second power lines 103, 104 is allowed, transmission of the communication signal to the load 3 via the coupler 12 and the first and second power lines 103, 104 is prevented, and each of a voltage (Vout) and a current (Iout) that are outputted by the control device 1 to the load 3 varies according to the grid power; and during each time period ($t_1$) where the first and second switches 111, 112 operate in the OFF state, transmission of the grid power to the load 3 via the first and second switches 111, 112 and the first and second power lines 103, 104 is prevented, transmission of the communication signal to the load 3 via the coupler 12 and the first and second power lines 103, 104 is allowed, and each of the voltage (Vout) and the current (Iout) varies according to the communication signal. In addition, a parameter of the load 3 (e.g., a brightness of light emitted by the light emitting device or a rotary speed of the motor) varies according to the duty ratio of $t_2/(t_1+t_2)$, and the load 3 can obtain the command based on the voltage (Vout) during each time period ($t_1$).

The first matching device 5 is connected to the control device 1 through the first and second power lines 103, 104, and has an impedance substantially equal to (i.e., approximating or equal to) a characteristic impedance of the first and second power lines 103, 104 so as to reduce reflection of the signals induced respectively on the first and second power lines 103, 104 by the communication signal.

The second matching device 6 is connected to a first common node (n1) between the control device 1 and the first power line 103, and to a second common node (n2) between the control device 1 and the second power line 104. The second matching device 6 has an impedance substantially equal to (i.e., approximating or equal to) the characteristic impedance of the first and second power lines 103, 104 so as to reduce reflection of signals that are generated from the signals induced respectively on the first and second power lines 103, 104 by the communication signal as attributed to reflection by the first and second power lines 103, 104, the load 3 and the first matching device 5.

In this embodiment, each of the first and second power lines 103, 104 has a first end terminal that is coupled to the control device 1 and the second matching device 6, a second end terminal that is coupled to the first matching device 5, and an intermediate terminal that is near the second end terminal and that is coupled to the load 3.

Figure 3:
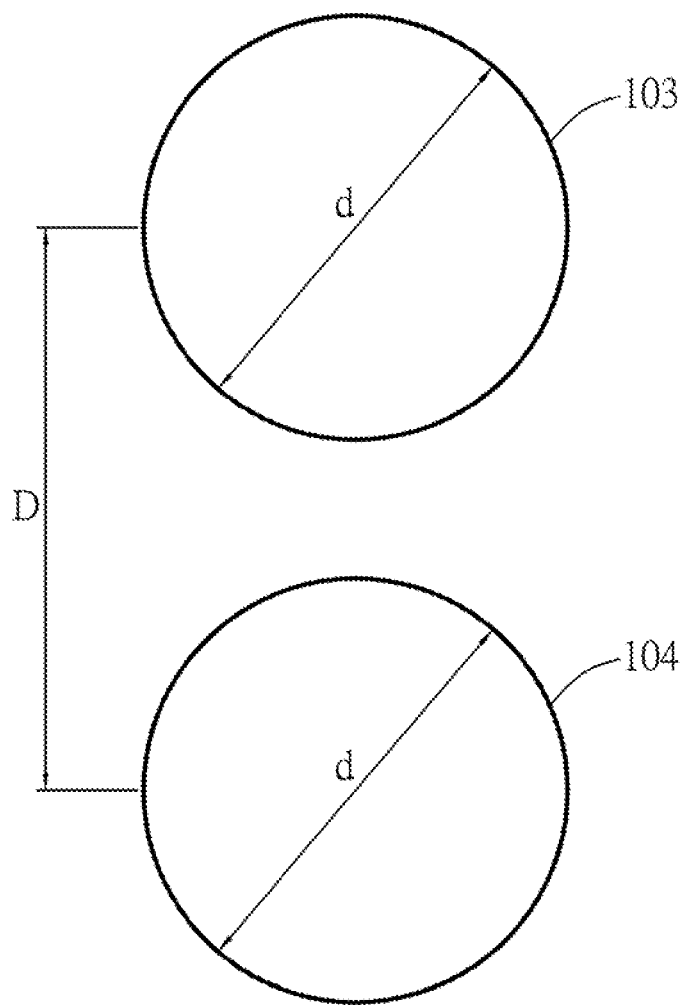
FIG. 3 is a schematic diagram illustrating the first and second power lines.

In this embodiment, the first and second power lines 103, 104 constitute a two-wire transmission line as shown in FIG. 3. The first matching device 5 includes a first capacitor 51 and a first resistor 52 that are connected in series between the first and second power lines 103, 104. The second matching device 6 includes a second capacitor 61 and a second resistor 62 that are connected in series between the first and second common nodes (n1, n2). Each of the first and second resistors 52, 62 has a resistance of $120 \times \ln(2D/d)$ ohms (e.g., about 150 ohms), in which D is a distance between centers of the first and second power lines 103, 104 and d is a diameter of each of the first and second power lines 103, 104 as shown in FIG. 3.

In view of the above, the control system 100 of this embodiment has the following advantages:

1. Since transmission of the communication signal to the load 3 is allowed during each time period ($t_1$) where the first and second switches 111, 112 operate in the OFF state, interference in the signals induced respectively on the first and second power lines 103, 104 by the communication signal as attributed to the grid power is prevented. Therefore, a voltage amplitude of each of the signals induced respectively on the first and second power lines 103, 104 by the communication signal can be lowered so as to reduce power consumption of the control system 100, compared to a configuration in which the second switch 112 is omitted and the second common node (n2) is connected to the neutral line 102.

2. Since transmission of the communication signal to the load 3 is allowed during each time period ($t_1$) where the first and second switches 111, 112 operate in the OFF state, impedances seen by the coupler 12 respectively into the first and second common nodes (n1, n2) during each time period ($t_1$) are relatively large, thereby reducing the current (Iout) during each time period ($t_1$) and thus the power consumption of the control system 100.

3. Since the controller 10 switches the first and second switches 111, 112 from the ON state to the OFF state when the voltage (Vin) is substantially equal to zero, a power factor and operation of the load 3 are almost unaffected, and security issues are prevented, thereby enhancing compatibility of the control system 100 with the load 3.

4. With the first matching device 5, reflection of the signals induced respectively on the first and second power lines 103, 104 by the communication signal is relatively small, thereby reducing distortion of the same when the first and second power lines 103, 104 are relatively long. For example, when the frequency of the communication signal is 200 kHz, the distortion is relatively low even if each of the first and second power lines 103, 104 has a length longer than half a wavelength of the communication signal (i.e., 750 meters).

5. With the second matching device 6, distortion of the signals induced respectively on the first and second power lines 103, 104 by the communication signal can be further reduced when the first and second power lines 103, 104 are relatively long.

6. Since the coupler 12 uses differential signaling techniques, a common-mode noise of the signals induced respectively on the first and second power lines 103, 104 by the communication signal can be easily rejected. Therefore, a voltage amplitude of each of these signals can be lowered so as to reduce the power consumption of the control system 100.

It is noted that, in other embodiments, the following modifications may be made to this embodiment:

1. The controller 10 may switch the first and second switches 111, 112 from the ON state to the OFF state when the voltage (Vin) is not substantially equal to zero. In this case, connections of the controller 10 to the live line 101 and the neutral line 102 may be omitted.

2. Connection of the coupler 12 to the second power line 104 may be omitted, and the coupler 12 may couple the communication signal only to the first power line 103. In other words, the coupler 12 may use single-ended signaling techniques.

3. The receiver 13 may be connected wiredly to the transmitter 8, and receive the input signal from the transmitter 8 in a wired manner (e.g., using Ethernet or RS-485).

4. At least one of the first and second matching devices 5, 6 may be omitted.

While this disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A control system comprising:
    a control device adapted to be connected to a live line and a neutral line that transmit a grid power, and to a load via a first power line and a second power line that constitute a two-wire transmission line, said control device including:
        a first switch adapted to be connected between the live line and the first power line,
        a second switch adapted to be connected between the neutral line and the second power line,
        a coupler adapted to be connected to the first power line, receiving a communication signal, and coupling the communication signal to the first power line, and
        a controller connected to said first and second switches and to said coupler, controlling said first and second switches to synchronously alternate between an ON state and an OFF state, and outputting the communication signal to said coupler when said first and second switches operate in the OFF state, so as to allow transmission of the grid power to the load when said first and second switches operate in the ON state, and to allow transmission of the communication signal to the load when said first and second switches operate in the OFF state; and a first matching device connected to said control device through the first and second power lines, and having an impedance substantially equal to a characteristic impedance of the first and second power lines, wherein said first matching device includes a first capacitor and a first resistor that are connected in series between the first and second power lines, said first resistor having a resistance of $120 \times \ln(2D/d)$ ohms, in which D is a distance between centers of the first and second power lines and d is a diameter of each of the first and second power lines.

2. The control system of claim 1, further comprising a second matching device that is connected to a first common node between said control device and the first power line, and to a second common node between said control device and the second power line, said second matching device having an impedance substantially equal to a characteristic impedance of the first and second power lines.

3. The control system of claim 2, the first and second power lines constituting a two-wire transmission line, wherein said second matching device includes a second capacitor and a second resistor that are connected in series between said first and second common nodes, said second resistor having a resistance of $120 \times \ln(2D/d)$ ohms, in which D is a distance between centers of the first and second power lines and d is a diameter of each of the first and second power lines.

4. The control system of claim 1, wherein said coupler is connected further to the second power line, and couples the communication signal to the first power line and further to the second power line in a manner such that signals induced respectively on the first and second power lines by the communication signal are complementary to each other.

5. The control system of claim 1, wherein said control device further includes a receiver that receives an input signal carrying a command, said controller being connected further to said receiver for receiving the input signal therefrom, and generating, based on the input signal, the communication signal carrying the command.

6. The control system of claim 5, wherein said receiver receives the input signal in a wireless manner.

7. The control system of claim 5, wherein said receiver receives the input signal in a wired manner.

8. The control system of claim 1, wherein said controller is adapted to be connected to the live line and the neutral line, and switches said first and second switches from the ON state to the OFF state when a voltage of the grid power is substantially equal to zero.

9. A control system comprising:
a control device adapted to be connected to a live line and a neutral line that transmit a grid power, and to a load via a first power line and a second power, said control device including:
a first switch adapted to be connected between the live line and the first power line,
a second switch adapted to be connected between the neutral line and the second power line, and
a coupler adapted to be connected to the first power line, receiving a communication signal, and coupling the communication signal to the first power line, and
a controller connected to said first and second switches and to said coupler, controlling said first and second switches to synchronously alternate between an ON state and an OFF state, and outputting the communication signal to said coupler when said first and second switches operate in the OFF state, so as to allow transmission of the grid power to the load when said first and second switches operate in the ON state, and to allow transmission of the communication signal to the load when said first and second switches operate in the OFF state; and
a second matching device that is connected to a first common node between said control device and the first power line, and to a second common node between said control device and the second power line, said second matching device having an impedance substantially equal to a characteristic impedance of the first and second power lines.

10. The control system of claim 9, wherein the first and second power lines constitute a two-wire transmission line, wherein said second matching device includes a second capacitor and a second resistor that are connected in series between said first and second common nodes, said second resistor having a resistance of $120 \times \ln(2D/d)$ ohms, in which D is a distance between centers of the first and second power lines and d is a diameter of each of the first and second power lines.

* * * * *